United States Patent [19]

Rasmussen

[11] 4,436,568
[45] Mar. 13, 1984

[54] IN SITU PRECIPITATED FIBROUS LAMINATE AND METHOD OF PRODUCING SAME

[76] Inventor: Ole-Bendt Rasmussen, Forchwaldstrasse 23, CH-6318 Walchwil/Zug, Switzerland

[21] Appl. No.: 488,004

[22] Filed: May 2, 1983

Related U.S. Application Data

[60] Continuation of Ser. No. 177,806, Aug. 13, 1980, abandoned, which is a division of Ser. No. 102,561, Dec. 11, 1979, Pat. No. 4,294,638, which is a continuation of Ser. No. 841,481, Oct. 12, 1977, abandoned, which is a continuation of Ser. No. 657,649, Feb. 12, 1976, abandoned.

[30] Foreign Application Priority Data

Feb. 12, 1975 [GB] United Kingdom ............... 5971/75

[51] Int. Cl.³ .................. B65H 81/00; B32B 31/00; B29C 19/00
[52] U.S. Cl. .................................. 156/176; 156/187; 156/229; 156/244.13; 264/173; 428/109
[58] Field of Search .................. 156/229, 244.13, 176, 156/187, 195, 200; 478/109, 110, 113; 264/173

[56] References Cited

U.S. PATENT DOCUMENTS

| | | | |
|---|---|---|---|
| 3,281,897 | 11/1966 | Mercer | 423/380 |
| 3,499,822 | 3/1970 | Rasmussen | 428/293 |
| 3,505,162 | 4/1970 | Rasmussen | 428/294 |
| 3,565,744 | 2/1971 | Rasmussen | 428/137 |
| 3,632,711 | 1/1972 | Rasmussen | 264/171 |
| 3,677,873 | 7/1972 | Rasmussen | 428/155 |
| 4,113,546 | 9/1978 | Anders | 156/195 |
| 4,138,503 | 2/1979 | Ziolko | 264/173 |
| 4,207,045 | 6/1980 | Rasmussen | 425/133.1 |
| 4,227,957 | 10/1980 | Keuchel et al. | 156/500 |
| 4,294,638 | 10/1981 | Rasmussen | 156/176 |
| 4,331,497 | 5/1982 | Gilman et al. | 156/195 |

FOREIGN PATENT DOCUMENTS 1185736  3/1970  United Kingdom .

OTHER PUBLICATIONS

Rieche, "Outline of Industrial Organic Chemistry", 3rd Ed., Chemical Publishing Co. Inc., 1970, p. 361–363.

Primary Examiner—William R. Dixon, Jr.
Attorney, Agent, or Firm—William J. Daniel

[57] ABSTRACT

Multi-layer fibrous sheet laminate having layers with criss-crossing predominate grain directions, each layer being a three-dimensional reticulate structure of polymer fibers precipitated in situ from a polymer solution in a solvent or swelling agent therefor. The layers are produced by extrusion from a slot onto a collecting surface moving away from the slot to impart the predominate grain direction thereto and the laminate can be produced in a single extrusion operation utilizing two sequentially arranged circular extrusion slots with a common tubular collecting surface while rotating such extrusion slots in different relative directions.

3 Claims, 10 Drawing Figures

IN SITU PRECIPITATED FIBROUS LAMINATE AND METHOD OF PRODUCING SAME

This application is a continuation, of application Ser. No. 177,806, filed Aug. 13, 1980 now abandoned, which is a division of Ser. No. 102,561, filed Dec. 11, 1979, now U.S. Pat. No. 4,294,638 issued Oct. 1981, which was in turn a continuation of Ser. No. 841,481, filed Oct. 12, 1977, now abandoned, which was in turn a continuation of Ser. No. 657,649, filed Feb. 12, 1976, now abandoned.

The present invention relates to a method of manufacturing a sheet, board, tube or pipe, hereinafter referred to as sheet-like structure, by extruding a material in a generally fluid state through a circular die or diepart rotating around its axis to form a structure with a direction of grain angularly arranged with respect to the forwarding direction.

A method and apparatus of this general type is known from U.S. Pat. No. 3,281,897, in which two counterrotating exit parts form two circular helically twisted arrays of continuous filaments, which joint at their cross-points due to the shape of the orifices so that a net structure is formed. This and closely related methods are widely used but have drawbacks or limitations, e.g. in that the mesh has to be relatively wide and the filaments relatively coarse.

Another "family" of methods and apparatus of the type in question is disclosed in U.S. Pat. Nos. 3,505,162, 3,565,744, and 3,677,873. The basic idea of these patents is to join streams of different materials to fluid sheet form in an internal chamber of the die and helically turn the streams, while they are being strongly attenuated, by means of a rotating internal part. Thus the die may consist of: a fixed row of internal orifices which extrude the components in interspersed relationship, a first annular collecting chamber, a rotating circular row of partitions, and a second annular collecting chamber directly leading into an annular exit slot. The interspersed arrangement of different materials is hereby utilized to form a sheet with a fibre-like substructure of "lamellar" shape which can be applied to obtain, in combination with a layer of different grain, a high-strength film. Alternatively, the substructure may be disrupted to obtain a non-woven fabric. Since the attenuation takes place in several steps, very thin lamellae can be achieved, but due to a cutting of the lamellae into discontinuous lengths and a very irregular attenuation, both effects caused by the partitions, the substructure is uneven with a negative effect on the strength properties. Another route disclosed in the same three patents involves rotating the row of internal orifices, which extrude the components in interspersed relationship, and immediately join the streams in the collecting chamber directly leading to the exit slot. There is hereby obtained continuous and very even lamellae, but much higher speed of rotation is required to achieve the same low thickness of the lamellae. However, the melt orientation created by such high rotation leads to high elastic tensions in the extruded tube product after the exit from the die, which gives the tube a very pronounced tendency to shrink to a similar diameter. The control of the extrusion is therefore difficult.

A further method and apparatus of the abovementioned general type is known from U.S. Pat. No. 3,632,711. The rotation is here a relative rotation between two concentrical dieparts forming two cylindrical walls in an annular passageway through which the material is extruded on its way to a cylindrical exit slot. Two or more components are passed in side-by-side streams through this passageway, whereby the streams are smeared out and attenuated into fine generally concentric layers. These layers are subsequently combed by means of inwardly pointing teeth mounted on the two rotating walls, whereby the sheet acquires a fibrous substructure with criss-crossing grain. The substructure is either utilized for production of high-strength film, or it is disrupted to a nonwoven fabric.

However, this method and apparatus have several drawbacks. First, the fine combing teeth are difficult to maintain. Second, the attenuation (melt-drawing) takes place in a direction which is different from the combing, whereby the fibres of the substructure get notches or other irregularities.

The present invention has for its object to manufacture products of the abovementioned general type, of various structures and for various purposes, without the abovementioned drawbacks.

The invention is characterized by the steps of, supplying a flowable polymeric material to a circular extrusion die, said die having an annular extending orifice exit rotating about a hollow center, and extruding the material through said die to the exit, discharging the material from said exit either in form of a circular or annular array of individual filaments of cross-sectional shape including ribbons, or in continuous annular sheet form while stretching the discharged flowable material by said die exit rotation, collecting the material on collecting means which at least in the zone of collection has a surface which has generally cylindrical shape concentric with the axis of rotation of the die and is advanced forwardly through the hollow center of the die to convey the collected material away from said die exit, and while the material is conveyed on said advancing surface, solidifying the material and, if necessary to achieve a self-supporting sheet structure, combining the material with at least one other material, e.g. in film form.

Since the extruded material is directly wound on conveying means, the abovementioned drawbacks are eliminated. Thus the lateral elastic tension produced by the rotation now becomes an advantage, since it helps to deposit the material more precisely. Further, the location of collecting means including the converging surface close to the die exit enables a deeper draw-down, whereby very fine filaments and/or high melt-orientation is obtained. A further significant advantage of the invention is its capability for producing a sheet with highly fluid-drawn transverse structure made from fluid extrudeable materials which otherwise easily break during drawing, e.g. molten polymer or irregular composition, molten or dissolved polymer or pre-polymer with high contents of solid staple fibres, and extrudable masses of fibres in swollen state, such as swollen collagen fibres and the like.

Depending on the intended use and the material being extruded, the stretching by relative rotation takes place either in a free space between the orifice exit and the generally cylindrical collecting surface or in a generally annular "shear-chamber" defined by the exit part of the rotating die and the generally cylindrical collecting surface, whereby the rates of supply and withdrawal are adjusted to each other so as to maintain said chamber filled with material in a substantially pressurefree state. The stretching in a "shear-chamber" between die and conveying means provides for the most efficient conveying of the material and therefore is generally preferable in the case of materials which are difficult to stretch, while the stretching in a free space has an advantage, e.g. for the construction of the apparatus since the friction between the fluid material and the apparatus parts (exit of the die and conveying means) is avoided.

The invention is very suitable for producing continuous sheetlike structures (as contrasted with open fabric structures) exhibiting a substructure composed of continuous or almost continuous filaments. This can be achieved by discharging an array of free filaments from the exit of the rotating die while adjusting the rates of feed and withdrawal of material, and speed of rotation, to one another so as to lay-up the filaments sufficiently densely on the conveying means.

Another embodiment which also primarily aims at the manufacture of a continuous sheet-like structure with a transverse, highly melt-stretched fibrous substructure, is characterized by extruding different materials interspersed with one another and merging the streams with one another. The filamentituous substructure hereby becomes particularly distinct. Said merging can be carried out before the exit from the rotating die, and/or in a "shear-chamber" between the exit and the conveying means, and/or at the collection of free filaments on the conveying surface. A comparison between the three possibilities is given in connection with the description of FIGS. 5 to 8.

The interspersed extrusion and merger of different materials can also with advantage be used for manufacture of structures other than continuous sheet-like structures, e.g. for nonwoven fabrics. No matter whether continuous sheet structures or other structures are deposited on the conveying means, the merger of streams of different materials can with advantage be carried out in a regular pattern which at the same time as it involves a side-by-side arrangement, also involves an embedment, at least in part, of a second material in a first material. There is hereby generally achieved higher strength in the manufactured product.

An example hereof is the procedure explained in connection with FIGS. 5 to 7 in which one of the "lamella-forming" components also forms continuous surface layers so that the lamellae of a different component are fully embedded. A more pronounced incorporation, very useful e.g. in connection with the manufacture of high-strength film, is achieved by extruding the first material, immediately prior to the merging, through a multitude of relatively long slots extending in the direction of the axis of the rotation and arranged in a circular array, and extruding the other component through smaller orifices collected in groups in the same array between said longer slots, said groups being preferably lineary groups extending generally axially.

The fibrous substructure of a continuous sheet structure manufactured according to the invention need neither be based on a separate extrusion of filaments nor on a regular interspersing of different streams, but can also be a random substructure, however, with a distinct direction of grain. Thus, the discharged material can be an inhomogenuous blend of fluid polymers discharged in the form of a continuous sheet structure and collected on the conveying means. Continuous sheet structures produced in this manner are very useful, e.g. as plies in laminated, oriented high-strength film, or in connection with a subsequent swelling treatment (dissolving) of one component and fibrillation to a coherent splitfibre web, c.f. U.S. Pat. No. 3,499,822. In both cases, the use of the present invention enables a particularly strong melt-drawing which is highly advantageous for the strength properties of the final product.

In another embodiment of the invention yielding a random substructure, the discharged material is a blend of fluid polymer material and solid staple fibres, which is collected as a continuous tubular structure. Under the term "staple fibres" is also included pulp fibres. The incorporation of such fibres can be for filling and/or reinforcement purposes. The present invention in this case achieves a very efficient transverse alignment of the solid fibres, and, due to the support of the collected material on the conveying surface, surprisingly high contents of fibres are allowable.

The invention can further be used for the production of a highly melt-drawn, random fibrous substructure by discharging a molten polymer capable of segregating into different distinct fibrous polymer fractions when stretched in the molten state and solidified, preferably a polymer with high content of extraordinary high molecular weight substance, and collecting such polymer is a continuous tubular sheet structure. This embodiment is particularly suitable for manufacture of layers in laminated high-strength film.

Alternatively, the discharged material can be a polymer containing a solvent or swelling agent which is collected as a continuous tubular sheet structure, the solvent or swelling agent being caused to segregate in the polymer during conveyance. This embodiment is particularly suitable for manufacture of film for fibrillation.

In a similar embodiment of the invention, the discharged material is a polymer which contains dispersed droplets or bubbles of liquid matter, and is collected as a continuous tubular sheet structure.

An important aspect of the invention relates to the feeding of material into the rotating die and its delivery towards the exit of the die, and has for its object to allow high speed die rotation in simple manner without the abrasion of sealings and other problems connected with extrusion of very viscous material through revolving fittings of large diameter. Accordingly, an embodiment of the invention is characterized by feeding in substantially pressurefree state at least one strand of the material in generally fluid state into a continuous or discontinuous circular inlet orifice of the extrusion die, while distributing the material evenly along the inlet orifice circumference by rotation of the die, and creating an extrusion pressure on the polymeric material at said inlet orifice by shear action, to thereby extrude the material out of the exit of the die while maintaining it in generally annular form, e.g. as a tubular stream or a circular array of streams.

Figure 1:
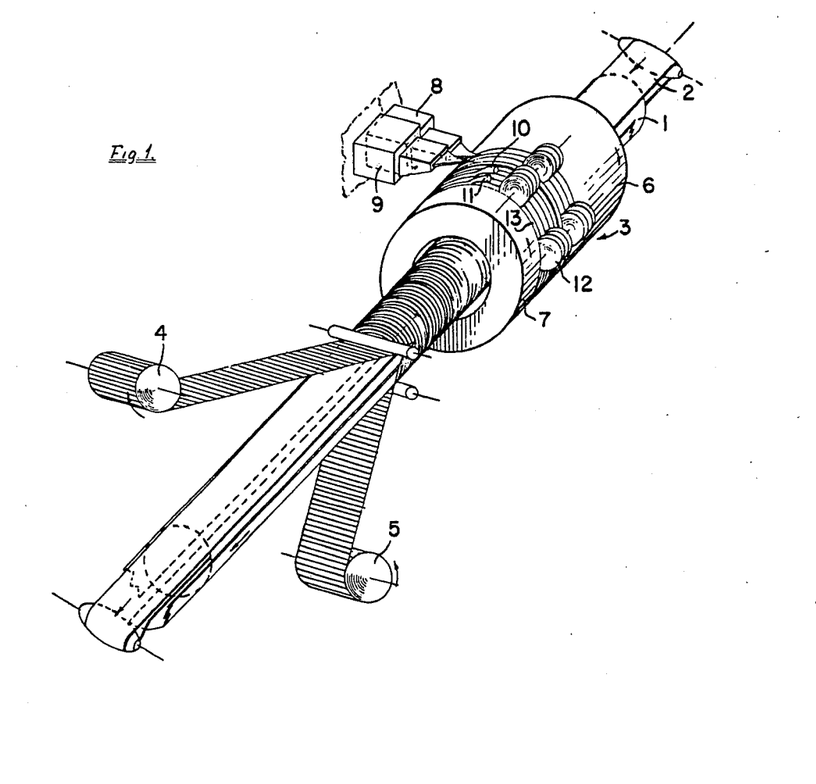
FIG. 1 is a schematical perspective view illustrating a preferred embodiment of the method and apparatus according to the invention, showing a pressurefree feed to a rotating die, external rollers as means to create the extrusion pressure, the use of two counter-rotating independently extruding dies discharging on the same collecting means to produce plural layers with criss-crossing directions of grain, and a set of conveyor belts on the mandrel as collecting and conveying means.

Depending e.g. on the flow-properties of the extruded material, it may be preferrable to use different measures to create the extrusion pressure e.g.:
  (a) A rolling or scraping action is applied against the inlet orifice or orifices, c.f. FIGS. 1 and 6.
  (b) Forming at least a circular inlet orifice of the die passage from two parts which are rotated relative to each other (at the same time as there is produced an overall bodily rotation of the material in one direction) and forming corrugations on the surface of at least one of said rotating parts in engagement with the material which extend obliquely from a tangential direction, so as to help the pumping towards the exit–cf. FIG. 2.

(c) Similar to measure (b), but making use of the Weissenberger effect which means that a visco-elastic material under rotational shear between discs drags towards the axis of the discs due to the elastic forces created by the shear. In this case, it is not necessary to corrugate any surface, but it is a must that the passageway leads generally inwardly in the shearing zone and that the material being extruded is visco-elastic-cf. FIG. 4.

Figure 3:
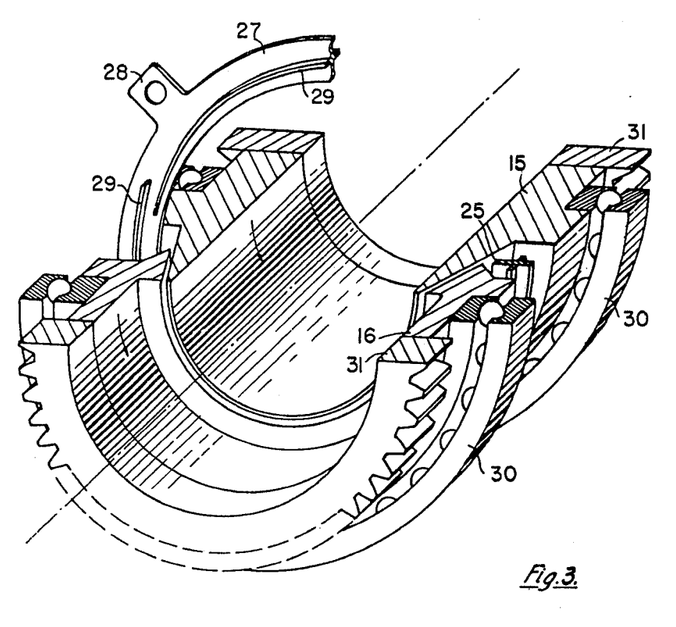
FIG. 3 is a perspective view partially in section of an embodiment of the rotating extrusion device of the invention, in which the extrusion pressure is created by means of an inserted fixed plate, the drawing further serving to show a suitable arrangement of drive and bearings.

(d) A fixed insert (e.g. ringformed) is present in a circular inlet orifice relative to which insert one or both surfaces of the inlet orifice rotate, cf. FIG. 3. The insert and/or orifice surface(s) can be corrugated in analogy with measure (b) above, or there can be made use of the Weissenberger effect described in measure (c) above.

When extruding tubular shaped streams and using relative rotations as described under measures (b) and (c), it is generally preferable to form the whole die of two corresponding parts moving relative to each other from inlet to exit of the conduit. The construction of such a die is particularly simple.

It is of course necessary to relatively adjust to each other, on one hand, the velocity by which the material is fed to the die (normally from a conentional extruder) and on the other hand the velocity of the rotation or rotations which cause the pumping of material through the die. Within limits, however, there is a selfcontrolling effect in the measures a-d described above. Thus—to take measure (b) as an example—the more the inlet orifice is filled with material, the greater will be the portion of the corrugated surface which is covered with material and which therefore participates in the pumping action.

As already mentioned, the grain formed in the sheetlike material according to the invention can in many cases with advantage be a grain based on random blending. In order to carry out such blending expediently different materials are fed at different locations to one and the same circumferential inlet orifice and are blended during passage to the exit orifice. One of the different materials can be a mass of solid staple fibres from a substance which does not melt or decompose at the temperatures of the extrusion. The material fed simultaneously with the solid fibres can be molten or dissolved polymer, or a pre-polymer. Due to the distribution of materials achieved by the rotation of the die around its axis, and to a blending immediately prior to the extrusion, blended mixtures with surprisingly high contents of solid fibres can be extruded in satisfactory eveness.

The advantage of interspersed extrusion of separate streams have also been maintained above. In conventional circular coextrusion, there are constructional complications in obtaining an even circumferential distribution of several components. In this connection, the pressurefree feed allows a significant simplification, and in a preferred embodiment different extrudable materials are fed into different circular inlet orifices, each either continuous or discontinuous, and are thereafter brought into interspersed relationship with one another, and are extruded in such relationship. (See FIGS. 5, 6, and 7).

Depending on the special circumstances, the collection and conveyance of the discharged material can be carried out in different ways. A particularly precise collection results when the material is collected on endless moving means, from which the material is eventually removed. A very practical way of conveying a cylindrical continuous tubular structure is by one or more continuously moving endless belts, which in the zone of collection are helically wound around a fixed support with the edges of immediately adjacent windings contiguous so as to define an essentially cylindrical surface in said zone, such helically wound belt being unwound from said support at a downstream locus with the collected material being separated by cutting at the location where two adjacent edges diverge from each other as one is removed from the support.

Alternatively, the conveying means can consist of or comprise a rotating generally toroid shaped solid mandrel advanced along the path of its lengthwise axis. This can be made a particularly solid construction able to keep up high torsional forces.

However, the simplest and in many cases as fully satisfactory conveying means is a continuously forwarded flexible sheet supported by a fixed mandrel.

The material as collected on the conveying surface can be very fragile due to its fibrous generally unidirectional substructure, and may even consist in a transverse array of unconnected filaments.

Therefore, in order to bring the material into self-supporting state, it is often necessary to combine the collected material with one or more further materials. Such combination can comprise lamination with a reinforceing substance while the material is conveyed by the conveying means. As an example hereof, the reinforcing substance is fed between the conveying means and the extruded material. As another example hereof, the sheet used as conveying means is adhered to the collected material and remains as a layer in the final sheetlike structure. This is particularly simple and practical, when the conveying surface is provided by a flexible sheet supported by a fixed mandrel as mentioned above. (See FIG. 4).

Figure 10:
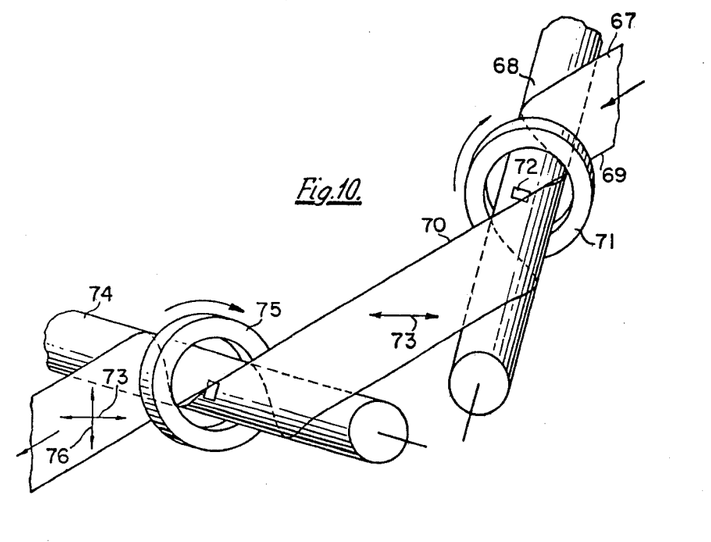
FIG. 10 is a schematic perspective view of a further, preferred embodiment of the method and apparatus according to the invention, illustrating the use of a helically advancing conveyor belt in the hollow center of the die.

Alternatively, or additionally, the helically rotating extrusion process according to the invention can be carried out with several rotating dies working in line or in series with a common collecting surface, and with their duration of rotations so selected that the different dies produce different direction of grain in the material discharged, thereby to obtain a crosslaminate (See FIGS. 1 and 10).

As mentioned before, the invention permits the processing of fluid materials which are otherwise difficult to extrude. This opens a simple way to extrusion of substructure very valuable sheets from dissolved or swollen polymer substances, from blends of such substances with solid fibres, and from blends of solid fibres and pre-polymers. In such cases, a rather prolongated solidification process can be involved, and it is consequently a great advantage that the material is conveyed.

Thus, an embodiment of the invention comprises the extrusion of a dissolved or swollen polymer, or a blend of dissolved polymer and solid fibres, and solidification of the material by coagulation and/or drying.

In similar way, a further embodiment comprises the extrusion of a blend of solid staple fibres and a pre-polymer, and solidification of the material by afterpolymerization on the conveying surface.

The invention further relates to an apparatus for carrying out the method, comprising a rotatable circular extrusion die with a hollow center and provided at the inner circumferential wall, or an end wall, or at a boundary between such walls, with a continuous or discontinuous circular exit slot, the apparatus further comprising means for feeding fluid extrudable material into said die and means for extruding the material through the die to the exit, and means for continuously passing generally cylindrical convehing and collecting means through the hollow center.

Different embodiments of this apparatus appear from the above description of the method.

The invention will now be described in more detail with reference to the drawings of which.

The apparatus of FIG. 1 comprises a fixed supporting mandrel (1) provided with three endless conveyor belts (2) that together essentially cover the surface of the mandrel. After the cooling of the film, it is cut up and rolled on bobbins (4) and (5).

The apparatus shown also comprises a composite die (3) with two counter-rotating single dies (6) and (7) each of which is fed pressurefree from plural extruders of which only two (8) and (9) are shown, while the streams emerging from the two other extruders are indicated by (10) and (11). The rollers (12) which press the polymer streams into circular inlet grooves (13) can conveniently be heated by hot air, e.g. from the inside. They may be replaced by scrapers heated e.g. by a cycloterm. The extrusion die (3) may be heated from only one location as the rotation of the die will distribute the heat. Induction heating may be used, and the temperature may be controlled by pyrometers.

Figure 8:
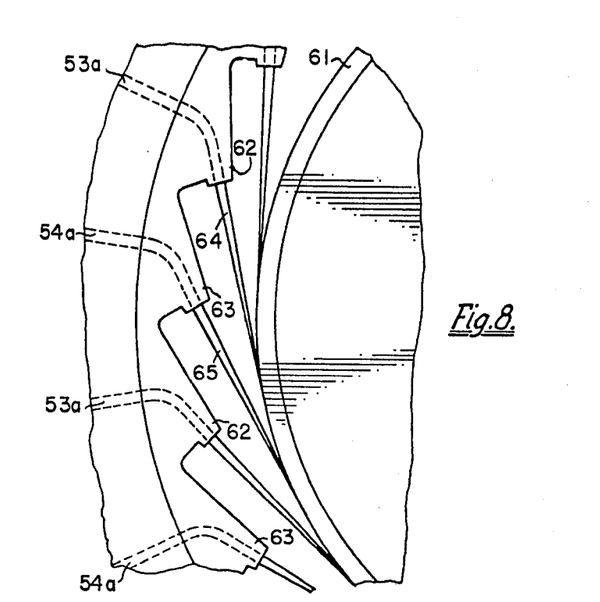
FIG. 8 is a fragmentary transverse section through the exit part of the rotating die and the mandrel which illustrates in principle, a modification of the embodiment showin in FIGS. 5, 6 and 7, by which the two sets of streams are brought in interspersed relationship within the rotating die, but are extruded and attenuated separately and are merged into a tubular sheet at the collection on the collecting surface.

Each inlet groove (13) is connected with one or several exit orifices (not seen in FIG. 8). The composite extrusion die can be fed from fewer or more than mentioned and the die could consist of one, two or more rotating or counter-rotating single dies, if convenient with fixed extrusion dies in-between.

A pronounced advantage provided by the combination of several single dies around a common collecting mandrel is the fact that the layers of a composite sheet may be applied successively over each other, but under relatively independent circumstances, so that each layer may be treated individually, e.g. as to heat. Generally, the extrusion can take place out of one or more continuous circular exit slots or out of one or more orifices or out of a circular row of orifices together forming a discontinuous exit orifice. Each exit orifice or slot can be situated on the interior surface of the extruder die, which is convenient for rapid rotation, at the end face of the die, e.g. for slow or no rotation, but most practically at the junction or corner between these two surfaces, as the conditions for simultaneously controlling and cooling the polymer stream at this point are optimal.

Figure 2:
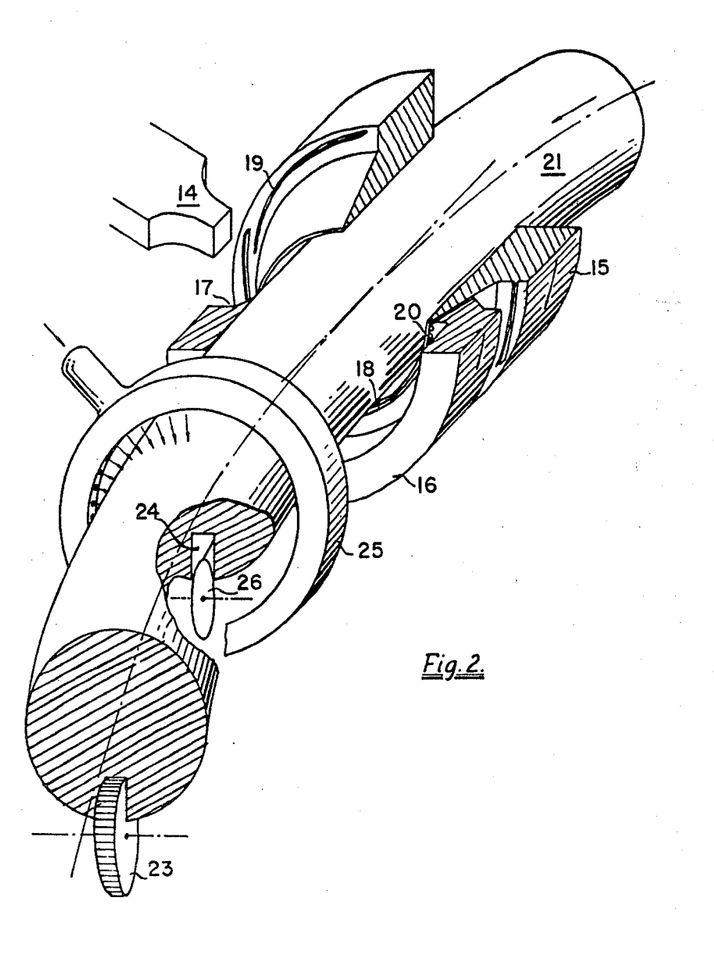
FIG. 2 is a schematical perspective view partially in section illustrating another preferred embodiment of the method and apparatus according to the invention, showing as the means to create the extrusion pressure two disc-formed dieparts moving with different velocities and supplied with internal guide vanes, further showing a toroidal mandrel as the collecting and conveying means, and illustrating consolidation of the collected material by chemical treatment while being conveyed on the mandrel.

While it is expected that the rolling or scraping action described in connection with FIG. 1 is especially efficient in connection with material of particularly low fluidity, e.g. very high molecular weight polymers, the extrusion die of FIG. 2 is preferred in many other cases due to its simplicity. The die of FIG. 2—which is fed with a pressurefree stream (strand) from a supply extruder outlet (14)—consists of two unconnected parts (15) and (16) which define between adjacent surfaces a passage consisting of the inlet orifice (17) and in immediate communication herewith the exit orifice (18). (There may however, conveniently be a longer passageway between the inlet and exit comprising one or several widened chambers for further improvement of the polymer distribution).

The two parts (15) and (16) are held in position and in the proper spacing from each other through external bearings and are driven at different velocities through gear wheels (for details regarding the arrangement of bearings and gear wheels, see FIG. 3). The different velocities are indicated by the two arrows of different lengths. In order to achieve an efficient pumping action, the walls of the inlet orifice can be supplied with suitable vanes (19) which here are only shown on one of the parts. However, a sufficient pumping action can often be obtained without such vanes or corrugations due to the known tendency in visco-elastic material to drag inwardly when applied between counter-rotating discs (the Weissenberger effect).

At the same time as the two parts (15) and (16) rotate relative to each other, it is essential that the material fed into the die is rotated on the whole in order to become properly distributed. The arrows indicate that these parts rotate at different velocities in the same direction. It is also allowable to let one stand still, or even to rotate the two parts in opposite directions, however, with different velocity rates so that the material on the average is always rotated in one direction.

Also in this embodiment the heating of the die can be by induction, but due to the simplicity and compactness of the construction, it is even possible to use open flames.

The exit orifice can be a plain circular slot for extruding a tubular film—as indicated at (18)—or alternatively it can be supplied with corrugations—as indicated at (20)—adapted to extrude a circular array of filaments. When the distance from the die exit to the surface of collecting mandrel (21) is short, the risk of breaking such fibres is greatly reduced, and a layer of fine fibres can be produced even from a rather unevently corrugated exit slot.

The collecting and forwarding mandrel (21) is of rigid toroidal shape and supported and is continuously driven in the direction of the arrow (22) by means of a series of driven wheels of which one (23) is shown.

In order to facilitate the support and drive, the inner part of the toroidal mandrel is supplied with a deep narrow groove (24) with which the drive wheels fit. The wheels (23) may conveniently be gear-wheels fitting with rack-like teeth in the groove of the mandrel.

The invention is very suitable for materials which require a relatively complicated or prolongated treatment, e.g. coagulation of dissolved polymer, or other chemical treatment. Such treatment is indicated by the circular spray (25) from which e.g. a solution for coagulation can be sprayed onto the material. Similarly, there can be special heating and/or cooling means and/or irradiation means associated with the mandrel.

Before being stripped off from the mandrel surface, the material is cut, conveniently at the locus of the groove (24), as shown by the rotating knife (26). There can further be scrapers or the like (not shown) to remove extruded material from the groove.

Due to the absence of mechanical seals, the rotating die can without much complication be manufactured with relatively large diamter, e.g. 1 to 2 m. The toroidal mandrel can conveniently have a bodily diameter 5 to 20 times that of the inner diameter of the die, and should in practice be assembled from several preferably hollow rigid sections.

In FIG. 2 the die lips on the sides of the exit orifice rotate relative to each other. Thus, the extruded material is under shear at the exit orifice which can introduce tensions which under certain rheological conditions can introduce instabilities during the draw-down.

The embodiment shown in FIG. 3 takes care of this difficulty since it allows the two parts (15) and (16) to rotate at the same velocity (and in the same direction).

If the device is constructed for extrusion of an array of filaments, they can even be connected through an orifice-block at the exit (not shown).

The extrusion pressure in FIG. 3 is achieved by means of a ringformed insert (27) held stationary by several supports of which one (28) is shown. There is hereby established a driving shear between the insert (27) and each of the rotating die parts (15) and (16). The insert is shown supplied with vanes (29).

There can also, or alternatively, be vanes on the inlet orifice surfaces of (15) and (16) or all vanes (corrugations) can be omitted. There is preferably fed one or several strands of material on each axial side of the insert (27).

This drawing further shows the bearings (30) and (31) for each of the die parts (15) and (16).

Figure 4:
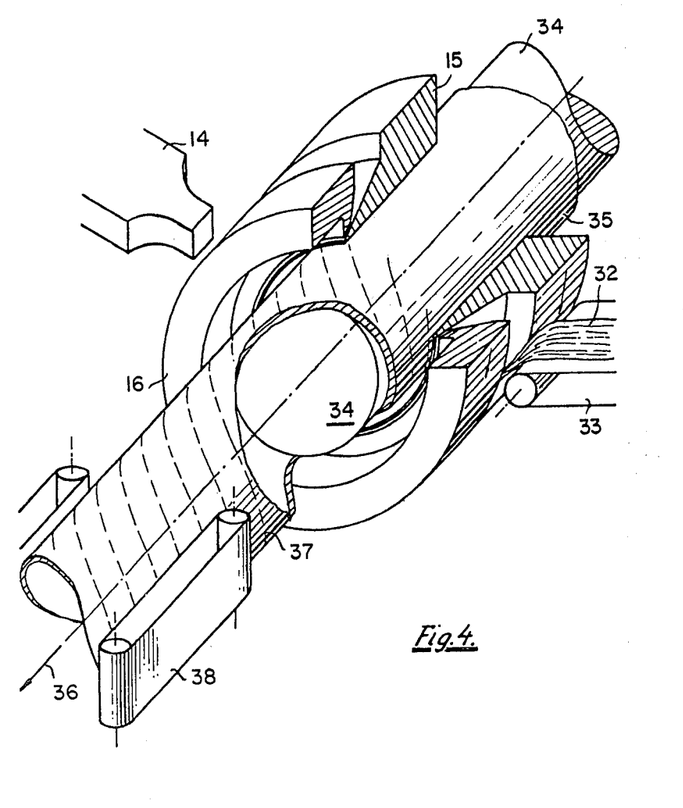
FIG. 4 is a schematical perspective view partially in section of still another preferred embodiment of the method and apparatus according to the invention, showing a separate feed of solid staple fibres to the rotating die to be blended with the polymer during die rotation, and further showing the use of a fixed mandrel, and as conveying means a sheet which is folded over or wrapped around the mandrel and is laminated with the material collected from the rotating die to form a layer in the final product.

In FIG. 4 there is fed, simultaneously with the pressure-free feed of polymer from the extruder outlet (14) a web (32) of staple fibres which have melting point higher than the processing temperature of the system. This can e.g. be inorganic fibres such as glass, asbestos, or rockwool. The feed is shown taking place by means of a conveyor belt, but coult also be by any other means. The die is shown without an internal vanes or corrugations, i.e. the extrusion pressure is created entirely by the Weissenberger effect. In face, a slight corrugation is generally preferable, although strong shear forces may cause excessive breaking of the fibres. It should be noted that a direct feed of fibres into the die is highly advantageous compared with a prior admixture of the fibres to the polymer and common feeding through (14).

In this way a more even feed is secured with much less occurence of fibre breakage, and also much higher contents of fibres can be used.

The mixing of fibres and fluid polymer takes place partly during feeding and partly by the shear exerted during the passage towards the circular exit slot (18). The conveying and supporting collection system consists in FIG. 4 of a mandrel (34) that is fixed by means not shown, and a flat sheet (35), folded or wrapped in a tubular shape around the mandrel (34). The sheet (35) may be produced e.g. by extrusion from a flat die upstream in line with the rotating extrusion die or it may be produced beforehand.

For the sake of clarity a space is shown between the mandrel (34) and the folded sheet (35), but of course the sheet is lying upon the mandrel. The sheet (35) is pulled through the extrusion die over the mandrel as indicated by the arrow (36). When the polymer film in molten state leaves the rotating exit slot (18), it is strongly melt-stretched (attenuated) by which the fibres are aligned in the direction of attenuation, and is deposited or collected upon the surface of the folded sheet (35) because of the elastic retention in the attenuated polymer. Thus it is wound around said folded sheet and forwarded along with it, developing a helical running direction of grain indicated by the broken helical line (37).

The advance of the sheet (35) is established by conveyor belts (38). The mandrel is preferably supplied with cooling means (not shown). The concentration of the extruded material can conveniently be matched by a gradual reduction of the diameter of the mandrel.

The conveyor sheet is produced from generally the same polymer as that deposited onto it in molten state—or an adhesive can be applied—so that conveying sheet will be laminated with the extruded material to remain as a layer in the final product.

The product so manufactured is a tube or pipe with transverse reinforcement by the staple fibres, suitable for improvement of the cushion strength of the tube. Further improvements of the strength characteristics can be obtained with two stations of rotating extrusion dies (cf. FIG. 1) and/or by inclusion of longitudinally arranged fibres in the conveyor sheet. Further, if a relatively thick inner layer is desirable, the rotating extrusion can be carried out around such layer in generally tubular shape without any fixed mandrel located in the hollow of the die.

The feature of permanently laminating the conveying means with the rotatingly extruded material is neither restricted to the application in conjunction with a feed of higher melting fibres to the rotating die, nor to the production of reinforced pipes or tubes, but has many other applications in connection with consolidation or reinforcement of rotatingly extruded material.

Figures 5, 7:
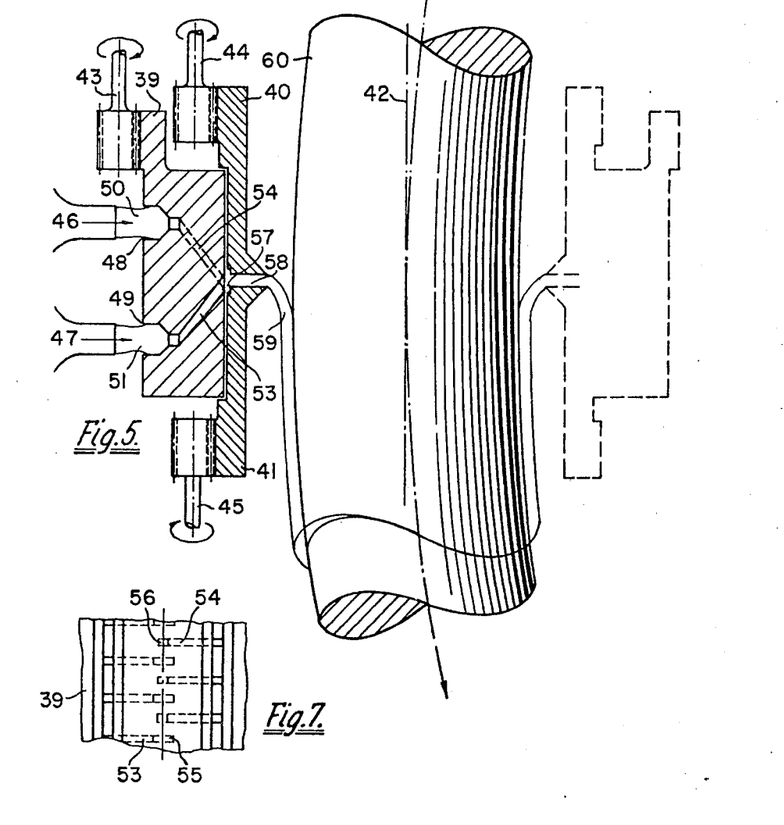
FIGS. 5, 6, and 7 are three different sections which show, in fragmentary diagramatic fashion, a preferred embodiment of the method and apparatus in which two sets of streams of different composition are merged with each other in generally side-by-side relation in the rotating die and are subsequently attenuated to a fine structure in the space between the die exit and the collecting surface, the drawings, further showing the use of scrapers at the two inlet grooves to the rotating die as means to create the extrusion pressure.
Figure 6:
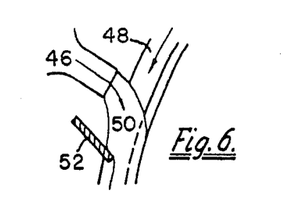

The die shown in various sections in FIGS. 5, 6, and 7 consists of three parts, viz. an inlet and manifold part (39) and two separate exit half-parts (40) and (41). The three parts are rotated around the axis (42) by drives (43), (44), and (45), respectively, all in the same direction and all three with relatively high velocity. The two exit half-parts (40) and (41) move at the same velocity, and the relative velocity between these parts and the inlet part (39) is low compared to their absolute velocities.

The die is supplied from two extruder outlets (46) and (47) feeding into circumferential grooves (48) and (49), respectively, and the streams of two different polymer materials (50) and (51) are brought under pressure by rows of scrapers (52), and by way of two rows of passageways (53) and (54) are brought side-by-side in one array, and extruded through a circular row of alternating orifices (55) and (56) into a short annular collecting chamber (57), formed between the two exit parts (40) and (41), which ends in a circular exit slot (58).

From the exit slot (58) the two interspersed groups of juxtaposed streams are extruded in the form of a composite tubulr sheet (59) onto the cylindrical conveying-/collecting means, here shown as a toroid (60).

In the collecting chamber (57) and the exit slot (58), the interspersed (juxtaposed) streams still form a relatively coarse configuration, limited in structure fineness by the pitch of the row of orifices (55) and (56), but when the composite still fluid sheet is attenuated between the relatively fast rotating circular exit slot (58) and the collecting surface of mandrel (60), each part-stream is strongly attenuated and is converted to a thin ribbon. By sufficiently high velocities the ribbons can be attenuated to a few microns thickness, or less.

The sheet has a "lamellar structure", i.e. a sheet substructure constituted of thin lamella-like elements which extend at an angle to the surface of the sheet.

Other methods of producing a lamellar structure are disclosed e.g. in U.S. Pat. Nos. 3,505,162, 3,565,744, and 3,677,873, where e.g. the applications of the sub-structure is explained. However, the method described here allows much stronger the regular attenuation and hence the formation of a finer regular substructure.

As it appears from FIG. 7, the slots (55) are circumferentially longer than the slots (56) and extend beyond both ends of these shorter slots. By the movement of the collecting chamber (57) relative to the orifices, the material extruded through the longer orifices will hereby normally by smearing-out form continuous layers on both surfaces. This feature as such is known from the above-mentioned U.S. Pat. No. 3,565,744 where it is further explained. If such effects are not desired, there is no need to move the exit of the die in relation to the passageways (53) and (54). This is e.g. the case if it is desirable to produce a "lamellar" substructure with all lamellae traversing from one sheet surface to the other. The orifices (55) and (56) can then preferably be of equal length and fully in array.

It is obvious that this embodiment of the invention can be carried out also with three or more polymeric components coextruded and interspersed with one another.

In FIG. 8 the juxtaposed extrusion system explained above is modified by omitting the independent two exit half-parts (40) and (41) and bringing the interspersed sets of passageways (53) and (54)—in FIG. 8 numbered (53 a) and (54 a)—all way through to the exit of the die, from where the two components are extruded directluy into the space between the rotating die and the mandrel (61) through a circular array of protruding exit orifices (62) and (63). The fibres of different materials, (64) and (65) respectively, are attenuated generally tangentially with respect to the mandrel peripheral surface and are collected and forwarded on the latter in interspersed relationship.

The protruding asymmetrical design of the orifices (62) and (63) secures the release of the polymer material from the die.

If the exit orifices (62) and (63) are slots with a relative high elongation generally in the axial direction of the die, they will extrude ribbon-filaments which will be collected on the mandrel in overlapping manner, generally as a "lamellar structure". A much more irregular, but more truly fibrous interspersed substructure in the extruded film is usually achieved if the orifices are relatively short in the axial direction.

In FIG. 8 the exit orifices (62) for one component are very elongated slots while each of the orifices (63) for the other component is a row of small part-orifices or holes (66). The ribbons extruded through (62) will be collected in overlapping arrangement like shingles, while each of the filaments extruded through a part-orifice (66) will be embedded between a pair of the ribbons. The merged ribbons will thereby form a matrix for the filaments of the other material. The diameter of the fobres so produced can e.g. be 1 to 20 denier, many times smaller than the thickness of the sheet, and they can be arranged so densely that they occupy e.g. 50 to 90% of the entire sheet.

Although several methods are known for coextrusion of continuous filaments in a sheeet matrix, none of these are capable of producing similar fibre fineness simultaneously with a similer fibre density.

The sheet so produced is very suitable e.g. as a layer in high-strength film. For this purpose, the filaments should preferably consist of highly crystalline polymer (e.g. polypropylene) and the matrix of a much softer and less crystalline polymer (e.g. low density polyethylene).

Figure 9:
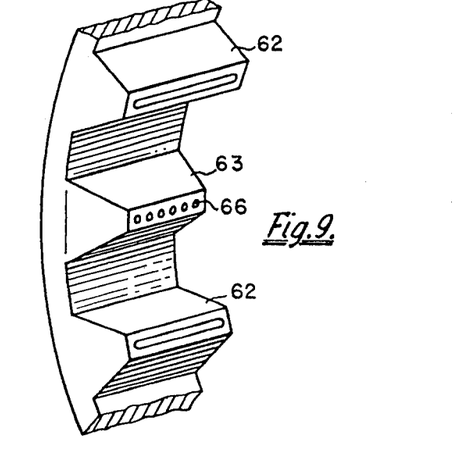
FIG. 9 is a detail shown in perspective of FIG. 8 with special orifice shapes adapted to produce continuous filaments of one component wholly embedded in another component.

Comparing the embodiment shown in FIGS. 5, 6 and 7 with the modification hereof shown in FIGS. 8 (and 9), the merging of streams to sheeet-form prior to their discharge through the die exit slot, i.e. within the die passages, generally allows higher throughputs and a higher degree of attenuation between die and mandrel without breakage, but optimal results are only obtained in this case if the melt-viscosities of the different materials match relatively well. When, on the other hand, the discrete streams are attenuated pressurefree and the joining takes place on the mandrel surface (cf. FIG. 8) there is no need to match the melt viscosities. A kind of compromise between the two systems can also be used, viz. to extrude the streams separately to the inside periphery of the rotating die, and adapt the velocity of the mandrel to the total throughput of the two components so that the clearance space between die and mandrel is filled-up with polymer without creation of an excess of pressure in this space. In other words, the space between die and mandrel serves as a "collecting chamber" in which the interspersed streams are merged and smeared out by the rotation. In this case, protrusion of the exit orifices into this clearance space, e.g. as in FIGS. 8 and 9, should preferably be avoided.

A further suitable way to utilize the interspersed juxtaposed arrangement or orifices formed by the passageways (53) and (54) of FIG. 5 is to unite the two (or more) different materials to a pre-formed array of conjugate filaments (which may also be ribbons) which are extruded separately and collected and bonded together on the mandrel. Each conjugate filament may either have ordinary side-by-side or sheath/core or any other convenient conjugate structure.

Instead of converting such conjugate filaments into a continuous film by collection on the mandrel surface, the throughputs, die rotation and mandrel velocities can be adapted to form an open set of spiral-laid filaments, which can subsequently be combined with similar conjugate filaments, laid-down by a die rotating in the opposite direction, cf. FIG. 1. The two sets of filaments can conveniently be fused together at their intersections, while still on the mandrel, at a temperature at which one component is molten and the other one solid.

In FIG. 10, an endless continuously moved conveyor belt (67) is wound helically around a fixed supporting mandrel (68) in such a way that its left edge (69) fits against its right edge (70). Thus it acts, as were it an "endless" cylinder continuously "screwed forward" through the hollow center of die 71. At the point where the belt is unwound from the mandrel, a knife (72) cuts the collected material in order to release the belt from the mandrel. If the die rotates very fast compared to the movement of the belt, the direction of grain will be almost 45° as shown by arrows (73). The same belt 70 can extend over and around another mandrel (74) arranged with its axis perpendicular to mandrel (68), and a similar lay-up is carried out, from another rotating die (75), whereby another layer of material is collected with direction of grain (76) almost perpendicular to (73).

The driving means are not shown in FIG. 10. The mandrels (68) and (74) can conveniently be supplied with special bearings to facilitate the helical movement of the conveyor belt (67). The procedure can be carried out without any use of a mandrel to support the belt (67) if the latter has a sufficient stiffness and is supported by suitable bearings.

The above description of the drawings has covered several different aspects of the invention: different ways of creating an extrusion pressure in a pressurefree fed rotating die inlet orifice, the feed of solid fibres to the rotating die, the interspersing of different streams prior to collection on conveying means, different collecting means in connection with the take-up, and different ways of consolidating the sheet. The different aspects described can of course be combined in many ways other than those expressly mentioned.

EXAMPLE 1

This example illustrates the use of the invention for production of a novel porous paper to textile like sheet with a fibrous substructure, by extrusion of a polymer in dissolved state and segregation of the solvent within the sheet during the solidification. For this purpose, the following procedure will be convenient:

A 50% solution of high density polyethylene can be used (density of the solid polymer: 0.96, melt index: 0.2 according to the ASTM melt index specification, condition L). The apparatus shown in FIG. 4 will be suitable, however without feed of fibres, and preferably provided with vanes in order to increase the pumping effect. Inner diameter of the die equals 300 mm, and temperature of extrusion 120° C. Two such dies should be used in adjacent in line or serial arrangement around the same mandrel; and rotating in opposite directions to obtain criss-crossing fibre grain.

The conveying sheet, forwarded over a fixed mandrel of diameter 280 mm, can conveniently be a nylon or polyethyleneterephthalate film taken from one bobbin, wound helically around the mandrel, brought back to flat shape after use, and finally collected on another bobbin for re-use.

The mandrel should be cooled from the inside. The polyethylene collected will hereby precipitate as a 3-dimensional net-like substructure consisting of microfibres. A part of the polyethylene will bleed-out, while most of the rest remains between the fibres as a distinct phase.

One extrusion die lays-up the polymer in a left-handed helical grain, and the other in a right-handed helical grain. Angles of about 70° with the mandrel axis are suitable.

After stripping-off from the conveyor film, the fibrous sheet should be stretched longitudinally, e.g. until the two directions of grain become essentially perpendicular to each other, taken as an average (the fibres will become partly randomized by the stretching). The sheet is hereby made more porous and flexible. The remaining xylene is finally removed by vacuum-drying.

EXAMPLE 2

This example illustrates a special use of the pressure-free fed rotating extrusion die, and the combined collection and lamination, with the object to form a novel corrugated drainage pipe without corrugation of the inner surface. For this purpose, the following procedure will be convenient:

The die of FIG. 3 should be used, however ending in e.g. 2 exit orifices (one would also be sufficient) of about 5 mm diameter. Polyethylene of density 0.96 and melt index 0.2 (ASTM condition L as above) can conveniently be used for this extrusion which is a melt-extrusion carried out e.g. at 200° C.

As collection and support means should be used a fixed mandrel and a pre-formed collecting film, generally as shown in FIG. 4. However, when the pre-formed film (ribbon) is folded around the mandrel, an axial gap of about 1 mm should be maintained between the edges instead of bringing the latter to overlap. The purpose of this gap is to leave an axial slot and make the final pipe permeable. This collecting film, which is intended to form the inner surface of the pipe, conveniently consists of the same material as the polymer fed to the rotatable die.

The die rotations should be adjusted to wind the two coarse filaments around the conveyor film in form of a double spiral (thread) with a few millimeters pitch. A suitable temperature of the mandrel at the zone of collection will be about 100° so as to allow the extruded double thread to fuse together with the conveyor film. A suitable thickness of the latter will be about 0.5 mm.

Direct water-cooling should be applied on the pipe immediately after the collection.

The structure can of course be modified by arranging two or more collecting tapes instead of only one ribbon around the mandrel with a small gap between each pair of adjacent edges, the tapes being held together by the extruded spirals.

EXAMPLE 3

With the object of producing an impermeable corrugated pipe, the procedure of example 3 can be modified by placing a fixed circular slot die in front of the mandrel and extruding the conveyor film directly from the die slot in tubular shape over the mandrel, the diameter of the circular exit slot of the fixed die should be a few centimeters bigger than the diameter of the mandrel. Strong cooling should be applied where the still molten conveyor film meets the mandrel and is "calibrated" by the latter.

EXAMPLE 4

This example illustrates the use of the invention for production of a novel sheet-like meat-substitute with a bicomponent "lamellar" structure, in which lamellae of protein are interspersed with lamellae of a polymeric softening agent. For this purpose, the following procedure will be convenient:

The apparatus of FIGS. 5, 6 and 7 should be used, however simplified by (a) avoiding the relative rotation between the inlet and exit parts, (b) making the internal extrusion slots of even length, and (c) substituting the toroid-shaped mandrel by a fixed cylindrical mandrel wrapped by a conveyor film of oriented polyeneterephthalate film, which is taken from a bobbin and is maintained as a support when the final food product is packed. The conveyance through the hollow in the center of the rotating die should be carried out vertically downwards.

A suitable first component is a solution of soya bean protein in 10% NaOH solution, the concentration of the protein being adjusted to give a viscosity about 100.000 cp at room temperature. A suitable second component (the softening component) is a solution of carboxymethyl-cellulose with addition of carmel (for sweetening and aroma). The concentration of the CMC should be adjusted to give the same viscosity as that of the first component.

A coagulating agent is rinsed over the extruded material immediately after the collection on the film. This can conveniently be a solution of 20% NaCl and 10% lactic acid. Only the protein is coagulated.

On leaving the mandrel, the conveying film with collected foodstuff sheet should be unwound to flat form, whereafter the collected material should be partly dried in an oven.

I claim:

1. A method of forming a fibrous sheet which comprises the steps of extruding from a given point onto a collecting surface a film of a viscous solution comprising a polymer dissolved in a solvent or swelling agent therefor, during such extrusion advancing the collecting surface away from the extrusion point, and subjecting the extruded film of said polymer extrusion to cooling to solidify the thus-extruded film to precipitate said dissolved polymer in the form of a random reticulate sheet-like array of solid fibers having a predominate grain direction by virtue of the movement of the collecting surface relative to said extrusion point, laminating the resultant fibrous sheet-like array with at least one other fibrous sheet-like array having a grain direction intersecting with that of the first sheet, and before or after said lamination substantially removing said solvent or swelling agent.

2. The method of claim 1 wherein said polymer extrusion is extruded onto a generally cylindrical collecting surface from a circular extrusion slot fixed against axial movement but rotated bodily about said surface; and said lamination is effected by extruding onto the first polymer solution film while carried on said collecting surface, a second film of a viscous solution comprising a polymer dissolved in a solvent or swelling agent therefor, said second film being extruded from a circular extrusion slot fixed against axial movement but rotated bodily in a different direction relative to the direction of said first slot to impart to said second film a different grain direction from that of said first polymer film.

3. The method of claim 1 including the step of stretching the laminate in a direction different from the grain direction of the individual layers thereof.

* * * * *